H. SCHULTZ.
WIRE SUPPORT FOR SEED CORN.
APPLICATION FILED JULY 14, 1913.
1,087,263.
Patented Feb. 17, 1914.
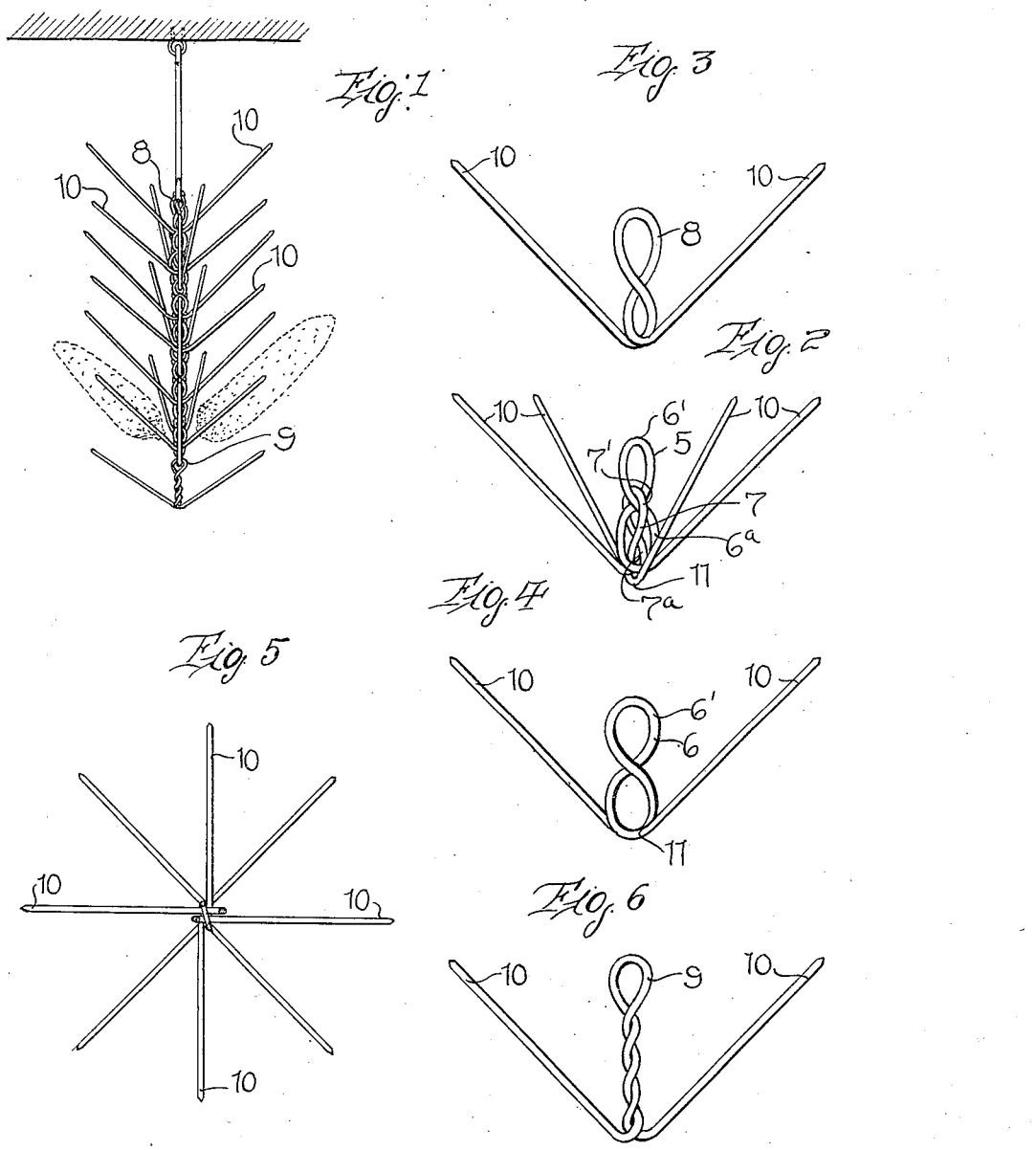
Inventor
HERMAN SCHULTZ.
Witnesses
By Watson E. Coleman
Attorney

UNITED STATES PATENT OFFICE.

HERMAN SCHULTZ, OF PARKERSBURG, IOWA.

WIRE SUPPORT FOR SEED-CORN.

1,087,263.  Specification of Letters Patent.  Patented Feb. 17, 1914.

Application filed July 14, 1913. Serial No. 779,028.

*To all whom it may concern:*

Be it known that I, HERMAN SCHULTZ, a citizen of the United States, residing at Parkersburg, in the county of Butler and State of Iowa, have invented certain new and useful Improvements in Wire Supports for Seed-Corn, of which the following is a specification, reference being had to the accompanying drawings.

This invention relates to seed corn driers, and it especially relates to an improved wire support for seed corn.

An object of the invention is to provide a device of this character which may be easily and cheaply manufactured and which will hold the ears of seed corn separated from each other and in position for allowing the free access of air between the ears and around each ear.

In the accompanying drawings, which supplement this specification, Figure 1 is a view illustrating one of the complete devices in use; Fig. 2 is a perspective view of one of the movable sections of the device; Fig. 3 is an elevation view illustrating the top element; Fig. 4 is an elevation view of one of the subsections; Fig. 5 is a horizontal sectional view; and Fig. 6 is an elevation view of the lower movable section of the device.

In these drawings, in which similar reference characters correspond with similar parts throughout the several views, the device comprises a multiplicity of movably united sections 5, each section comprising two similar sub-sections 6 and 7; an exception to the foregoing lies in the fact that the upper section 8 and lower section 9 each comprises a single piece of wire. The sections 6 and 7 are securely interlocked with one another, as indicated in the drawings, the upper portion of the lower loop 7' passing through and substantially at right angles to the lower portion of the loop 6', while the crossing wires of the 8-shaped member 6 extend through the upper loop of the 8-shaped member 7, and the crossing wires of the 8-shaped member 7 extend through the lower loop 6ª. It will be noted that each sub-section is formed from a single length of wire having both ends pointed, and that each length of wire is formed with a loop at its middle portion, that it is crossed and recrossed, so as to form the upper and lower loops previously mentioned, and that the two end portions 10 extend upward and outward in opposite directions from the lower crossing 11. Now, it will be seen that the lower crossing 11 is disposed within the lower loop 7ª of the sub-section 7, and that the arms or spines 10 of one sub-section stand substantially at right angles to those of the other sub-section, and that each spine 10 is adapted to support an ear of corn, by inserting the sharp point of the spine into the soft pith of the corn cob. Now, in order to provide a device of this character which will support a large number of ears of corn, I unite any desired number of these sections by engaging the upper loop 6' with the lower loop 7ª, the crossing 11 of which supports said upper loop and securely holds the contiguous sections together in movable relation.

By observing the horizontal sectional view, it will be seen that while the spines of each section stand at right angles to the adjacent spines, they stand at an angle of approximately forty-five degrees to the spines of the contiguous sections; so that the largest ears of corn may be placed on the respective spines without touching the ears supported by the adjacent spines.

While I have illustrated the device with a comparatively small number of sections, it is to be noted that there is no limit to the number of sections which may be connected together in the manner described; but in practice, it will probably be found that a device of this kind containing one hundred spines and being about one yard in length will meet with the most universal approval.

It will be seen that I have provided a device of this character which is fully capable of attaining the foregoing objects in a thoroughly practical manner.

While the accompanying drawings illustrate what I believe to be the preferred embodiment of my invention, it is to be understood that the invention is not limited thereto, but that various changes may be made in the construction, arrangement and proportions of the parts without departing from the scope of the invention, as defined in the appended claims.

I claim:

1. A device of the character described including a hanger section comprising two sub-sections, each of which is formed from a length of wire into a centrally disposed substantially 8-shaped member having spines extending laterally from its lower end, the 8-shaped members of the two sub-sections being securely interlocked with the spines of the upper sub-section directed through the loop of the 8-shaped member of the lower sub-section whereby the spines of each sub-section are disposed substantially at right angles to the spines of the other sub-section.

2. A device of the character described comprising a plurality of hanger sections, each hanger section including two sub-sections each of which is formed from a length of wire into a centrally disposed substantially 8-shaped member having spines extending laterally from its lower end, the 8-shaped members of the two sub-sections being securely interlocked with one another in such a manner that the spines of each sub-section are disposed substantially at right angles to the spines of the other sub-section, the spines of the lower sub-section being directed through the upper loop of a second hanger section.

In testimony whereof I hereunto affix my signature in the presence of two witnesses.

HERMAN SCHULTZ.

Witnesses:
M. L. EISENSCHMIDT,
O. NIEHUIS.